Sept. 25, 1973 K. J. PERRINGTON ET AL 3,761,311

DUAL-LAYER MAGNETIC RECORDING TAPE

Filed Aug. 23, 1971

INVENTORS
KENNETH J. PERRINGTON
PETER J. VOGELGESANG
JAMES K. KNUDSEN

BY Kinney, Alexander, Sell, Steldt & De La Hunt
ATTORNEYS

United States Patent Office 3,761,311

Patented Sept. 25, 1973

3,761,311
DUAL-LAYER MAGNETIC RECORDING TAPE

Kenneth J. Perrington, New Brighton, Peter J. Vogelgesang, Roseville, and James K. Knudsen, St. Paul, Minn., assignors to Minnesota Mining and Manufacturing Company, St. Paul, Minn.

Continuation-in-part of abandoned application Ser. No. 119,190, Feb. 26, 1971. This application Aug. 23, 1971, Ser. No. 174,113

Int. Cl. H01f *10/02*

U.S. Cl. 117—239 5 Claims

ABSTRACT OF THE DISCLOSURE

Magnetic recording tape having a dual-layer magnetizable coating to provide improved high frequency response when used in conventional audio recording devices, especially in cassette recorders. A typical tape has an outer magnetizable layer 40 microinches in thickness and 400–550 oersteds in coercivity and an inner layer 160 microinches in thickness and 270–330 oersteds in coercivity.

REFERENCE TO RELATED APPLICATION

Figure 1:
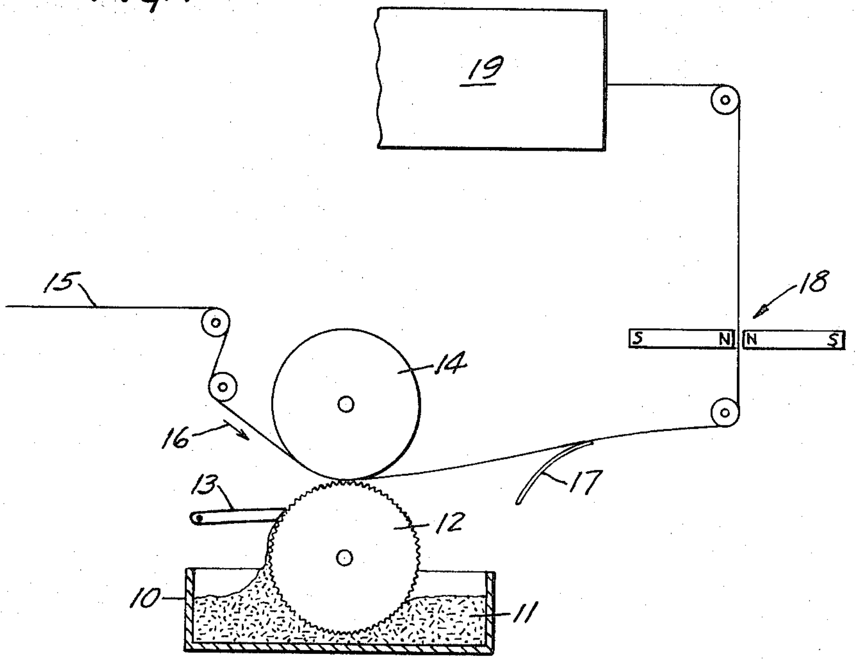

This application is a continuation-in-part of co-pending application Ser. No. 119,190, filed Feb. 26, 1971, now abandoned.

FIELD OF THE INVENTION

This invention concerns magnetic recording tape of the type having a coating of magnetizable particles in a nonmagnetizable binder. The invention is particularly concerned with magnetic recording tape for use in conventional audio magnetic recording devices.

BACKGROUND OF THE INVENTION

Magnetic recording tapes have long been known to be superior to phonograph records for use in professional audio recording. However, because magnetic recording tapes have been somewhat more expensive and less convenient for consumer use, the photograph record has remained dominant in the home market. This dominance has been threatened by the popularity of the compact cassette introduced in about 1965 by N. V. Philips' Gloeilampenfabrieken. Because of its slow tape speed (1.875 inches per second), high frequency response of the Philips cassette has been borderline. Better high frequency response without increased tape speed is much desired.

It is known that magnetic pigments having high coercivity provide magnetic recording tapes affording improved high frequency response. However, such tapes are incompatible with the bias capabilities of conventional cassette recorders. In order to effectively utilize chromium dioxide tapes now appearing on the market in cassettes, it is necessary to employ specially designed recorders. The same is true for other high coercivity magnetic pigments such as the cobalt oxide modified gamma-$Fe_2O_3$ disclosed in U.S. Pat. No. 3,573,980.

THE PRIOR ART

The most pertinent prior art is believed to be Kornei Pat. No. 2,643,130. Kornei discloses a multi-layer magnetic recording tape, the outermost layer of which has very high coercivity while the inner layers have progressively lower coercivity. While Kornei was particularly concerned about improved high frequency response, he did not provide any teaching which would enable one skilled in the art to make tapes which would be compatible with existing magnetic recording devices. Rather, his other main consideration was to reduce to a minimum the need for electrical equalization, but this would require specially designed recording devices either having no equalizing circuits or having greatly modified equalizing circuits. As for his objective of attaining better high frequency response, Kornei employed magnetizable materials with a more slanting slope of the hysteresis loop, and in this respect pointed away from important aspects of the present invention.

THE PRESENT INVENTION

The present invention primarily concerns magnetic recording tape which affords significantly improved high frequency response when used in conventional magnetic recording devices such as ordinary casssette recorders. This is accomplished by a dual-layer magnetizable coating, each of which layers is a homogeneous admixture of magnetizable particles in nonmagnetizable binder. The inner layer of the magnetizable coating is the thicker of the two layers and has relatively low coercivity, and the outer layer has relatively high coercivity.

Present-day cassette recorders are designed for use with magnetic recording tape having a coercivity of 300–350 oersteds. As a compatible replacement in the cassette recorders for audio tape having a single magnetizable layer 200 microinches in thickness, an illustrative tape of the present invention may have an inner layer which is 160 microinches in thickness and 270–330 oersteds in coercivity and an outer layer which is about 40 microinches in thickness and 400–550 oersteds in coercivity. By making the outer layer thinner, its coercivity may be higher while still retaining good compatibility with conventional magnetic recording devices, whereas a thicker outer layer calls for somewhat reduced coercivity. For the various suitable thicknesses of the outer layer, preferred coercivities are as follows:

| Thickness in microinches— | Coercivities in oersteds |
|---|---|
| 20 | 600–800 |
| 30 | 450–650 |
| 40 | 400–550 |
| 50 | 380–480 |
| 60 | 370–460 |
| 70 | 360–440 |

An outer magnetizable layer of only 20 microinches in thickness having sufficient uniformity for commercial use has not been attained at a suitably high proportion of magnetizable particles, and it is difficult in the present state of the art to attain uniformity at 30 microinches. Hence, it is presently preferred that the outer layer be about 40 microinches in thickness. On the other hand, there is no present technical advantage in making the outer layer greater than about 40 microinches in thickness, and when the exceedingly expensive chromium dioxide particles are used for the outer layer, economy dictates that the outer layer be as thin as possible unless even greater expense is encountered in attempting to reduce its thickness to about 30 microinches or so.

The inner layer preferably has a coercivity of at least 240 oersteds. Optimum audio recording on present-day cassette recorders has been realized at 330 oersteds for the inner layer. While problems with compatibility may be encountered above 360 oersteds, it is generally desirable to keep the coercivity as high as possible.

For use in audio recording devices which are designed for use with tape having a single magnetizable layer of a coercivity above 300–350 oersteds, the aforementioned coercivities of both the inner and outer layers should be proportionately higher. To illustrate, for a recording device designed for tape having a single magnetizable layer of 450–525 oersteds, a compatible tape of the present invention having an outer 40-microinch layer should have coercivities of about 600–825 oersteds and 360–540 oersteds at the outer and inner layers, respectively.

While the present invention is especially significant to the Philips cassettes because of the very slow tape speed, it is applicable to various audio tapes. Mastering tape compatible with single-layer tape of 300–350 oersteds may have an outer layer of 375–550 oersteds coercivity and a thickness of 40–70 microinches out of a total thickness of about 600 microinches for both magnetizable layers. This should permit reduced tape speed as compared to ordinary mastering tape on most presently available master tape recorders.

A preferred tape of the present invention may be made as follows:.

(1) applying onto a nonmagnetizable backing member a thin uniform coating of a dispersion in a volatile vehicle of a major proportion of magnetizable particles of 240–360 oersteds coercivity and a minor proportion of nonmagnetizable crosslinkable binder,
(2) evaporating the vehicle to provide a dry inner layer of at least 70 microinches in thickness,
(3) crosslinking the binder to a solvent-resistant state,
(4) applying over the inner layer a thin uniform coating of a second dispersion in a volatile vehicle of a major proportion of magnetizable particles and a minor proportion of nonmagnetizable binder,
(5) evaporating the vehicle to provide a dry outer layer of 20–70 microinches in thickness.

Where the inner magnetizable layer is less than 70 microinches in thickness, the outer layer should be no thicker than the inner layer.

Philips cassettes today are sold with three lengths of tapes: C–60, C–90 and C–120, the number indicating minutes of total recording tape in both directions. The magnetizable coating of the C–60 and C–90 cassettes generally is about 200 microinches in thickness, allowing about 130–180 microinches in thickness for the inner layer. The magnetizable coating of the C–120 cassette with present-day polyester backing members can only be about 120 microinches in thickness, allowing up to 80–100 microinches in thickness for the layer, which in any event should be at least equal in thickness to the outer layer to afford reasonably high output at low frequencies in conventional audio recording devices.

In order to provide desirably high output, each layer should comprise a major proportion by weight of magnetizable particles. A high proportion of magnetizable particles to binder is particularly beneficial in the outer layer, about 4–5 parts by weight of particles to one part of all nonmagnetizable materials in the binder portion. Preferably the same high proportion is also employed in the inner layer, especially when the total magnetizable coating is quite thin, as in the C–120 cassette.

In order to attain the intimate tape-to-head contact necessary for good high frequency response, the surface of the tape should have a peak-to-valley roughness not exceeding about 10 microinches and preferably less than 3–5 microinches as measured on the Bendix Proficorder using a 0.1 mil diamond stylus. Good high frequency response also depends upon the retentivity of the surface layer which is a function of the $B_r$, the $H_c/B_r$ ratio and the slope of the hysteresis loop. The high frequency output is improved by increased $B_r$, by increased $H_c/B_r$ and by increased slope. The $H_c$ is governed by the design of the recording device, as indicated above with reference to coating thickness. Hence, in order to maximize high frequency output while retaining compatibility, the $B_r$ and the slope should be maximized. The $B_r$ of a typical tape of the present invention is well over 1000 gauss, and to provide a steep slope, the particles of the outer magnetizable layer should be oriented so that their magnetic axes are aligned as much as possible in the longitudinal direction. Preferably the magnetizable particles of the inner layer should also be well oriented longitudinally.

The novel magnetic recording tape may be manufactured by sequentially applying to the backing member uniform coatings of dispersions of magnetizable particles and nonmagnetizable binder in a volatile vehicle. The binder of the inner layer may include a crosslinking agent which will cure the binder sufficiently to be resistant to the volatile vehicle used in applying the outer layer. It may be necessary after applying the inner layer to retain the tape at room temperature or at moderately elevated temperatures for a time to permit the inner layer to develop sufficient solvent resistance. After the inner layer has developed the necessary degree of solvent resistance, a second dispersion of binder and particles of relatively high coercivity is then applied over the inner layer. This is so thin that the volatile vehicle may evaporate too quickly to permit the usual smoothing, orienting and polishing procedures unless it is selected to have a slow evaporation rate. As in the application of any magnetizable coating, each dispersion should contain a surfactant which is compatible with the volatile vehicle to insure uniformity as well as adequate adhesion of the magnetizable particles to the binder.

In a preferred construction, the inner layer may comprise acicular gamma-$Fe_2O_3$ particles which have a coercivity of about 330 oersteds and are oriented in the longitudinal direction by a flat magnetic field as described in Von Behren Pat. No. 2,711,901. The outer layer may comprise cobalt oxide modified gamma-$Fe_2O_3$ particles as disclosed in the aforementioned Haller-Colline Pat. No. 3,573,980, which also are oriented in the longitudinal direction by a flat magnetic field. Such construction is not only applicable to tapes such as are used in Philips cassettes, but is also applicable to other common forms of magnetic recording tapes such as belts, in which the "longitudinal direction" extends circumferentially.

It is believed that in such preferred construction, the magnetizable particles are better oriented than are the particles of an oriented single tape layer of the same overall thickness. Better particle orientation provides improved signal-to-noise ratios.

The novel process enables tapes of extraordinarily smooth surface to be produced, which smoothness by itself provides better high frequency response as compared to polished tapes of the prior art. The improvement in surface smoothness is achieved by employing conventional polishing procedures both after applying the inner magnetizable layer and after applying the outer layer. These doubly polished tapes are believed to have better surface smoothness than single-layer tapes of the prior art which have received a conventional polishing treatment.

THE DRAWING

Figure 3:
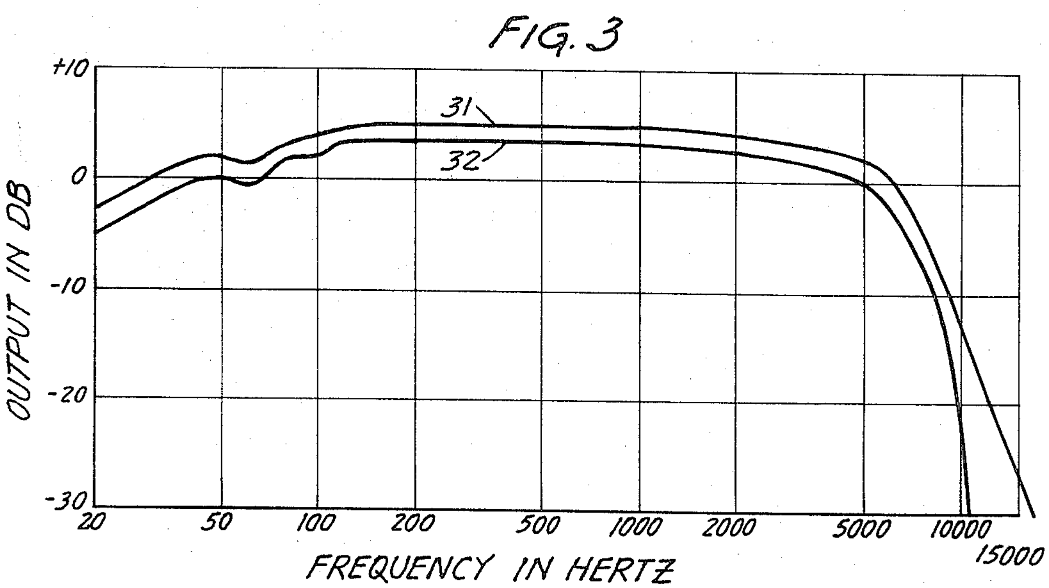
Figure 2:
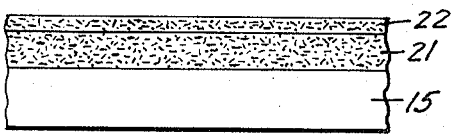

In the drawing:

FIG. 1 schematically shows a gravure coater useful for making the novel magnetic recording tape;

FIG. 2 schematically shows an edge view of a typical magnetic recording tape of the present invention; and FIG. 3 shows an output curve for a representative magnetic recording tape of the present invention in comparison to an output curve for a high quality audio tape now on the market.

The gravure coater of FIG. 1 includes a tank 10 which is continuously supplied with a dispersion 11 of magnetizable particles and binder. This is picked up in the fine grooves of a gravure roll 12 which is scraped by a doctor blade 13 so that substantially the only material left is that contained in the grooves. The dispersion is pressed by a rubber roll 14 into contact with and transferred to an uncoated backing member 15 which is moving at the same speed and in the same direction as the gravure roll 12, as indicated by the arrow 16. Before significant evaporation of the volatile vehicle, the knurl pattern of the coating is smoothed out by a flexible blade 17. The coated backing member then passes between a pair of bar magnes 18 to physically align the magnetizable particles and on to a heated oven 19 to dry the coating.

After the binder of the resultant coating has cured sufficiently to resist the volatile vehicle of the second dispersion, the coated tape may be carried through the same apparatus to apply an outer magnetizable layer directly over the inner layer. To make the outer layer thinner than the inner layer, a gravure roll is used which has finer grooves. The resultant two-layer tape, as greatly enlarged in FIG. 2, has a backing member 15, a relatively thick inner magnetizable layer 21 and a relatively thin outer layer 22.

EXAMPLE

The following were charged to a water-cooled production ball mill:

| | Pounds |
|---|---|
| 25% solution of polyurethane elastomer in methyl ethyl ketone | 280 |
| 30% solution of phenoxy resin in methyl ethyl ketone | 59 |
| Surfactant (phosphorylated ethoxylated long-chain alcohol) | 70 |
| Toluene | 700 |
| Methyl ethyl ketone | 600 |

The polyurethane elastomer was of the type sold as "Estane" 5703 and was prepared by reacting a hydroxyl-terminated polyester of 1,4-butanediol and adipic acid with p,p'-diphenylmethane diisocyanate and 1,4-butanediol while maintaining an isocyanate:hydroxyl ratio somewhat less than 0.99 to yield a stable polymer with terminal hydroxy groups. The phenoxy resin was a high molecular weight thermoplastic copolymer of equivalent amounts of bisphenol A and the diglycidyl ether of bisphenol A and was of the type sold as PKHH by Union Carbide Corporation.

After milling for 5 minutes, 2000 pounds of acicular gamma-$Fe_2O_3$ particles of 330 oersteds coercivity were added. Milling was continued for four hours and the viscosity was adjusted to 60 centipoises with equal parts of methyl ethyl ketone and toluene, followed by milling for an additional four hours. Next 40 pounds of dinonyl sodium sulfosuccinate were added and milling was continued for about an additional eight hours to provide a smooth dispersion. During these milling steps the temperature was maintained at about 80°–90° F. and was not allowed to exceed 100° F. At this point an additional 685 pounds of the same solution of polyurethane elastomer, 240 pounds of the same solution of phenoxy resin and 575 pounds each of toluene and methyl ethyl ketone were added, and milling was continued for two hours while not allowing the temperature to exceed 120° F. The viscosity was then adjusted to 50 centipoises with a 2:1 ratio of methyl ethyl ketone and toluene.

This dispersion was employed in making magnetic recording tape using apparatus as shown in FIG. 1 of the drawing. The backing member was biaxially-oridented polyethylene terephthalate polyester film of 430 microinches in thickness which had been asymmetricaly oriented for extra-high longitudinal strength. The polyester film had been treated with para-chlorophenol to improve adhesion. The gravure roll had a knurl of 50 lines per inch.

Immediately prior to putting this dispersion into the coating tank, 46.5 pounds of a crosslinking agent for the polyurethane elastomer were blended in, viz, "PAPI" sold by the Polychemical Division of Upjohn Company, which is polymethylene polyphenyl isocyanate having on the average 3.2 isocyanato groups per molecule. The coated polyester backing, after smoothing and passing through the flat magnetic field to orient the magnetizable particles, was heated in an air-circulating oven for about 1.5 minutes at about 150° F. followed by 1.5 minutes at about 200° F. to dry the coating and wound upon itself into roll form. The dried coating had a thickness of about 150 microinches. About one hour later, the tape was unwound and polished to an average roughness of about 3–5 microinches.

After this tape was stored in roll form for five days at room temperature to insure sufficient crosslinking of the polyurethane elastomer and phenoxy resin, an outer magnetizable coating was applied over the aforedescribed coating. The dispersion employed for the outer coating was made in the same way as that for the inner coating except as noted below. The initial charge was:

| | Pounds |
|---|---|
| 25% solution of polyurethane elastomer | 280 |
| 30% solution of phenoxy resin | 59 |
| Surfactant | 70 |
| Methyl ethyl ketone | 216 |
| Xylene | 500 |
| Cyclohexanone | 346 |
| Toluene | 259 |

The acicular gamma-$Fe_2O_3$ particles had been modified by cobalt oxide to provide a coercivity of 440 oersteds. At the point of adding additional binder, the following was used:

| | Pounds |
|---|---|
| 25% solution of polyurethane elastomer | 685 |
| 30% solution of phenoxy resin | 143 |
| Cyclohexanone | 775 |
| Xylene | 100 |

When milling was completed, the viscosity was adjusted to 45 centipoises with increments of

| | Pounds |
|---|---|
| Cyclohexanone | 38 |
| Xylene | 19 |
| Toluene | 10 |

The gravure roll was changed to 150 lines per inch, but in other respects the coating was applied in the same way to provide an outer magnetizable layer having a dried thickness of about 40–50 microinches. Within about an hour, the surface was polished to an average roughness of about 1.5–2.0 microinches, and the tape was slit to widths of 0.15 inch for audio cassette use.

The dual-layer tape of this example was tested at 1.875 inches per second using a Mincom Series 400 professional tape deck fitted with a Michigan Magnetics ½-track cassette record head with gap of 80 microinches and a Nortronics ¼-track cassette reproduce head with a gap of 50 microinches. The reproduce electronics were standardized using a Norelco TC-FR full track reproduce-and-alignment cassette tape. For the record electronics the operating bias (100 kHz.) was established for a conventional cassette tape (3M type 276) to give peak 333 Hz. sensitivity by selecting the bias level on the 6.3 kHz. sensitivity curve where the output drops 3.5 db from its peak value. Examination of the 333 Hz. sensitivity curve for both the conventional and the dual layer tape showed they were compatible, that is, they could use the same operating bias and thus were tested at the same bias level. The record pre-emphasis was adjusted for each of the conventional and dual-layer tapes to give an overall flat frequency response from about 50 Hz. to 15 kHz. at a level about 20 db below the level at which 3 percent third harmonic content occurs for 333 Hz.

FIG. 3 shows the frequency response curves for the two tapes with the output in db plotted as a function of frequency. The curve 31 is the output of the dual-layer tape and the curve 32 is the output of the conventional tape with each having an output at 333 Hz. having a 3% third harmonic content. Examination of FIG. 3 shows the dual-layer tape is capable of more output at high frequencies, about 10 db at 10 kHz. The improvement at low frequencies is due to higher pigment loading in the bottom layer of the dual-layer tape as compared to the conventional tape.

The dual-layer magnetic recording tape of the present invention may employ various magnetizable particles such as fine iron particles. Magnetizable chromium dioxide particles of suitable coercivity may be used in both the inner and outer layer, but generally their high expense would confine their use to the outer layer only.

While only two magnetizable layers are entirely adequate for the purpose of the invention, additional magnetizable layers are not precluded. For example, a surface coating of only a few microinches in thickness may be deposited onto the outer magnetizable layer by vacuum deposition or electroless plating of magnetizable material. Where the outer layer comprises magnetizable chromium dioxide, such a surface coating may inhibit the abrasiveness and sensitivity to moisture of the chromium dioxide.

What is claimed is:

1. Magnetic recording tape affording improved high frequency response in recording and reproducing of audio signals at relatively slow tape speeds such as the 1.875 inches per second of a conventional cassette recorder, which tape has a nonmagnetizable backing member carrying a dual-layer magnetizable coating of up to about 600 microinches in thickness, each of which layers is a homogeneous admixture comprising by weight a major proportion of magnetizable particles and a minor proportion of nonmagnetizable binder, characterized by the feature that the outer magnetizable layer has a thickness of about 20–70 microinches and a surface roughness not exceeding about 10 microinches and the thickness of the inner magnetizable layer is at least equal to that of the outer layer, for use with recording devices designed for single-layer tape 300–350 oersteds in coercivity, the coercivity of the inner layer is about 240–360 oersteds and the coercivity of the outer layer in relation to its thickness is as follows:

| Thickness in microinches— | Coercivities in oersteds |
|---|---|
| 20 | 600–800 |
| 30 | 450–650 |
| 40 | 400–550 |
| 50 | 380–480 |
| 60 | 370–460 |
| 70 | 360–440 |

and for use with recording devices designed for single-layer tape of coercivity above 300–350 oersteds, the coercivities of each of the inner and outer layers are proportionately higher.

2. Magnetic recording tape as defined in claim 1 wherein the outer layer has a thickness of about 40 microinches and a coercivity of about 400–500.

3. Magnetic recording tape as defined in claim 1 wherein the magnetic particles of both inner and outer layers comprise acicular gamma-$Fe_2O_3$ particles and are oriented in the longitudinal direction.

4. Magnetic recording tape as defined in claim 3 wherein the magnetizable particles of the outer layer comprise gamma-$Fe_2O_3$ particles modified by cobalt oxide.

5. Magnetic recording tape affording improved high frequency response in recording and reproducing of audio signals at relatively slow tape speeds such as the 1.875 inches per second of a conventional cassette recorder, which tape has a nonmagnetizable backing member carrying a dual-layer magnetizable coating of about 120–600 microinches in thickness, each of which layers is a homogeneous admixture comprising by weight a major proportion of magnetizable particles and a minor proportion of nonmagnetizable binder, characterized by the feature that the outer magnetizable layer has a surface roughness not exceeding about 10 microinches and a thickness of about 20–70 microinches and coercivity in relation to thickness as follows:

| Thickness in microinches— | Coercivities in oersteds |
|---|---|
| 20 | 600–800 |
| 30 | 450–650 |
| 40 | 400–550 |
| 50 | 380–480 |
| 60 | 370–460 |
| 70 | 360–440 |

and the inner magnetizable layer has a coercivity of about 240–360 oersteds and a thickness at least equal to that of the outer layer.

References Cited

UNITED STATES PATENTS

| | | | |
|---|---|---|---|
| 2,643,130 | 6/1953 | Kornei | 117—71 X |
| 3,597,273 | 8/1971 | Akashi et al. | 117—235 |
| 3,470,021 | 9/1969 | Hendricx et al. | 117—235 X |
| 3,679,476 | 7/1972 | Van Oosterhout et al. | 117—235 X |
| 3,505,109 | 4/1970 | Schnell | 117—237 |
| 3,573,980 | 4/1971 | Haller et al. | 117—238 |
| 2,711,901 | 6/1955 | Von Behren | 117—238 |

FOREIGN PATENTS

| | | | |
|---|---|---|---|
| 246,590 | 10/1969 | Australia | 117—238 |

WILLIAM D. MARTIN, Primary Examiner

B. D. PIANALTO, Assistant Examiner

U.S. Cl. X.R.

117—238, 240